Patented June 21, 1927.

1,633,106

UNITED STATES PATENT OFFICE.

CHARLES B. KELLY, OF SEATTLE, WASHINGTON.

PAINT-IMPROVING COMPOSITION AND SIZE.

No Drawing. Application filed May 24, 1926. Serial No. 111,378.

The present invention relates to a composition for admixture with paint and for use as a size or weatherproofing or waterproofing agent for paints and surfaces to which they are applied.

Paint treated with the composition is very elastic and when used for outside purposes is impervious to the action of the elements. The wearing qualities of a paint treated with the composition improves from 25 to 50%. The composition is a perfect adhesive and will not chalk, peel, crack, or blister when applied to a painted surface.

Paint mixed and ready for the brush, upon the addition of an equal volume of the composition, will result in double the quantity without reducing the original consistency of the paint. The composition is substantially odorless, non-poisonous, and antiseptic. Thinners may be used in conjunction with my composition in the manner in which thinners are usually employed.

The composition may be compounded as follows, although it should be appreciated that the proportions may be varied within limits as will be understood by persons skilled in the art. Two ounces of sodium hydroxide are dissolved in two quarts of water to which two percent of sodium bicarbonate are added. Three-fourths of a pound of corn starch are then thoroughly mixed with two gallons of water and the mixture is thoroughly added to the sodium hydroxide and sodium bicarbonate solution. The mixture should then be highly stirred to effect an emulsification and then ½ pint of boiled linseed oil should be added and the whole stirred to produce an emulsion. The resulting solution is colloidal and does not separate into its constituents. It will thus be observed that there results a colloidal solution comprising the following ingredients:

2½ gallons of water,
½ pint linseed oil,
2 ounces sodium hydroxide,
¾ pound of starch,
1.33 ounces sodium bicarbonate.

The amount of sodium bicarbonate is obtained by multiplying the weight of two quarts of water (4.17 pounds) by 2% and then reducing to ounces.

Sodium chloride, salt, may be added to the above colloidal solution in the amount of one and one-half ounces. Glue water may also be added in slight amount. The sodium bicarbonate may be omitted but I find it at times desirable to include it.

The composition as prepared above is preferably thinned by the gradual addition of water, accompanied by thorough mixing and stirring to produce a thinner colloidal solution. The mixings referred to must be of such character as to result in the production of colloidal solutions or suspensions which do not readily settle. Mixing by high speed rotating agitators suffices to accomplish the result, but other form of mixers may be employed. The addition of water referred to above may continue until the volume of the colloidal solution reaches five gallons, when the ingredients will be present in the following proportions:

5 gallons water,
½ pint linseed oil,
2 ounces of sodium hydroxide,
¾ pound of starch,
1.33 ounces of sodium bicarbonate.

The solution may be made more or less viscous by decreasing or increasing the amount of water.

The composition may be prepared also as follows: First I put five gallons of water into a container, dissolve 1½ pounds of corn starch in this and add approximately 3 ounces of sodium hydroxide dissolved in a small quantity of water. A relatively thick solution results. Next I put 2 gallons of this thick paste into a five gallon container, and add 1½ pints of boiled linseed oil and water gradually up to five gallons, while stirring at high speed for about 30 minutes more or less. The solution as thus prepared will contain 5 gallons of water,
1½ pints boiled linseed oil,
1¼ ounces sodium hydroxide,
⅗ pound corn starch,
and is a substantially creamy white colored liquid which takes on a whiter color as the agitation is continued.

My composition is used as indicated above by adding to equal quantities of paint although the amount of composition added to the usual oil or other paints may be lessened or increased depending upon the finish desired. I have found that excellent results are obtained when my product is used with paints, the basic ingredients of which are lead or zinc compounds, or lithopone.

A very excellent wall size can be made from the above ingredients. The wall size is prepared as follows: Five gallons of water are gradually added to and thoroughly mixed with 1½ pounds of corn starch and 3 ounces of sodium hydroxide. To this 1 quart of boiled linseed oil is added and the whole mixed at high speed as described above, for about 20 minutes or more. The solution which is obtained in the form of an emulsion, therefore, contains:

5 gallons water,
1 quart boiled linseed oil,
3 ounces sodium hydroxide,
1½ pounds of corn starch.

The content of water may be varied to suitably adjust the consistency for applying upon the surface or the composition may be applied without dilution. This composition when applied to the wall surface will form a film which can be painted over, or kalsomined. Also, if there is the presence of moisture in the plaster, the composition will form a moisture proofing film which will hold the moisture back and stop any chemical action in damp walls from attacking the inside finish regardless of what kind is applied after the composition has been applied. The composition, if desired may also be applied after a finishing coat or paint coat has been applied or to old painted or finished surfaces for the purposes indicated.

From the foregoing it will appear that the water content of my composition may and does vary within fairly wide limits, that the boiled linseed oil may and does vary from substantially ½ pint to substantially 1 quart, that the sodium hydroxide may and does vary from substantially 1 ounce to substantially 3 ounces, and that the corn starch (potato starch or flour) may and does vary substantially from ½ pound to substantially 1½ pounds. While potato starch and flour may be used, I have found as a result of experiment that corn starch is preferable and gives a more satisfactory product. Potassium hydroxide may be substituted for sodium hydroxide, but I prefer the latter.

It has been found that raw linseed oil may, with less desirable and less satisfactory results, be substituted wholly or in part for boiled linseed oil. The effect of the use of raw linseed oil instead of boiled linseed oil is to retard the drying, increases the time necessary to produce the emulsion and also has a tendency to discolor paint mixed for flat white.

The size as prepared as above described has been found to give excellent and unexpected results when used as a seal for a concrete or cement floor where the slab lies on the ground, making it possible to cement the entire surface of the linoleum cork tile or cork composition covering tightly to such a surface. At the present time when not employing the composition herein described, the capillary attraction of moisture is so prevalent that none of the cements known to date will hold more than a few months, whereas when the concrete or cement floor is protected by means of the present composition the cementing of the tile or floor covering is practically permanent.

Having described my invention what I claim and desire to secure by Letters Patent is:

1. A paint improving and waterproofing composition prepared by intimately mixing water, linseed oil, an alkali and starch, the starch and linseed oil being present in about equal quantities by weight, the alkali being present in a small amount as compared with the starch or linseed oil, and the water being present in sufficient quantity to give the composition at least a paste like consistency.

2. A composition for improving paint and for waterproofing surfaces which includes water, approximately ½ pint to 1 quart of boiled linseed oil, approximately 1 to 3 ounces sodium hydroxide and approximately ½ to 1½ pounds starch, the water being present in sufficient quantity to give the composition at least a paste like consistency.

In testimony whereof I affix my signature.

CHARLES B. KELLY.